(No Model.)
W. M. WILKIN.
GANG SAW MILL.
No. 336,192. Patented Feb. 16, 1886.
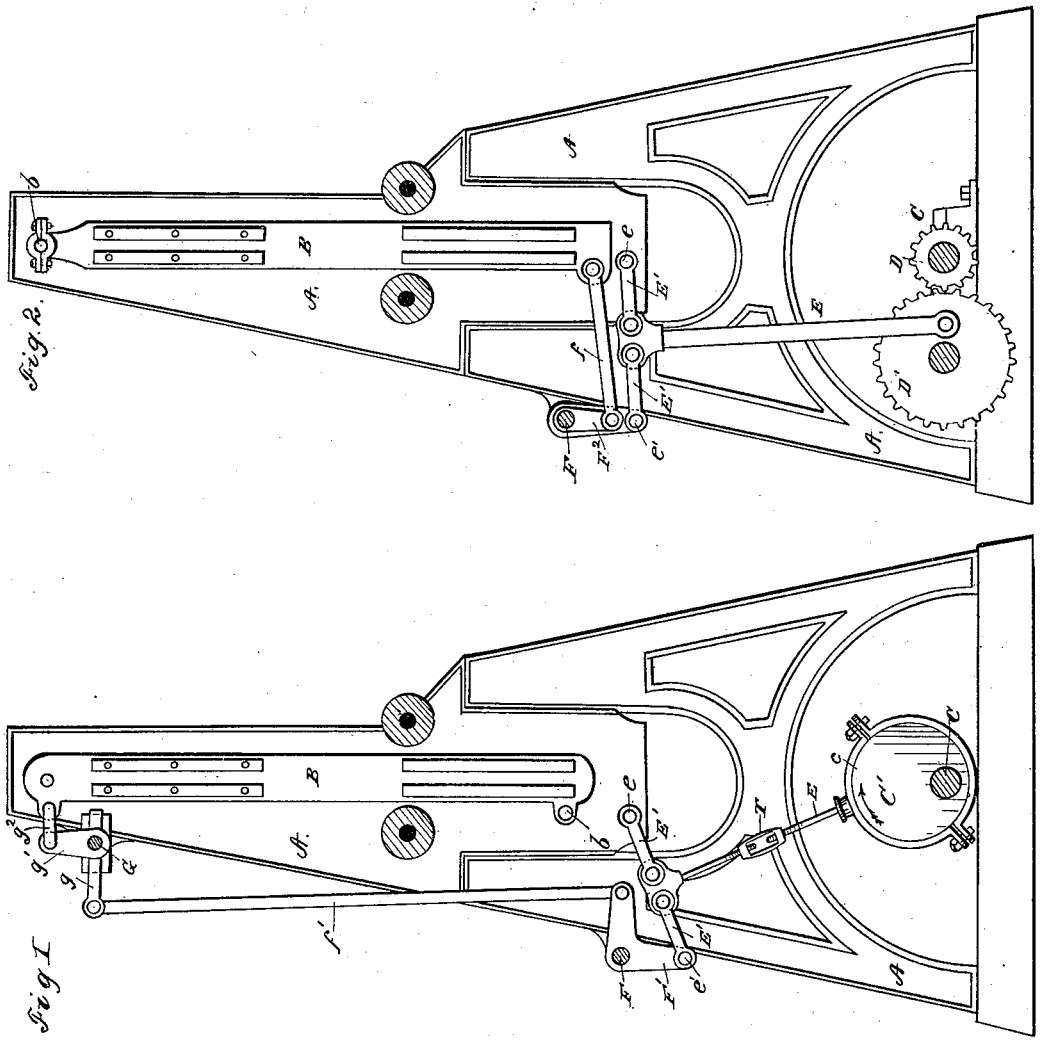
Witnesses
W. R. Edelin
T. F. Holden
Inventor
Wm. M. Wilkin
Per Hallock & Hallock
Att's

UNITED STATES PATENT OFFICE.

WILLIAM M. WILKIN, OF ERIE, PENNSYLVANIA.

GANG-SAW MILL.

SPECIFICATION forming part of Letters Patent No. 336,192, dated February 16, 1886.

Application filed February 21, 1884. Serial No. 121,545. (No model.)

*To all whom it may concern:*

Be it known that I, WILLIAM M. WILKIN, a citizen of the United States, residing at Erie, in the county of Erie and State of Pennsylvania, have invented certain new and useful Improvements in Reciprocating-Saw Mills; and I do hereby declare the following to be a full, clear, and exact description of the invention, such as will enable others skilled in the art to which it appertains to make and use the same.

This invention relates to reciprocating-saw mills, and particularly to that type known as "gangs."

The invention consists in providing new and improved means for giving the saws a proper forward or feed movement while they are cutting down, and a proper backward or clearance movement while they are moving up.

In this class of saw-mills the log is fed to the saw continuously at an even pace, whether the saw is cutting or moving up, and the saw is rocked forward as it cuts down and tipped back as it goes up. The forward movement is called the "feed" or "rake" and the backward movement the "clearance."

As the saw is reciprocated by a crank, its momentum vertically varies according to the position of the crank. For example, starting with the crank up, it will in moving one-eighth of a revolution—that is, one-fourth the way down—move the saws down only one-half as far as it will in the next eighth of a revolution. The third eighth of a revolution it will carry the saws down the same as the second, but in the fourth eighth it will move the saws only one-half that distance, or as far as it did in the first eighth. These four eighths represent the entire downward movement of the saw. Now, it should be obvious that the saw should only be rocked forward half as far during the first one-fourth of its downward movement as it should during the second, and the third fourth should be the same as the second, and the fourth the same as the first; but when the saws are moved up they should rock back rapidly during the first fourth of their upward movement, so as to get clearly away from the cant, and as it approaches the last part of its upward movement it may move back very slow. It has always been attempted to give the saws these movements by a simple crank or eccentric movement or gearing. A fairly correct downward movement can be effected by such gearing, but in moving up the saws will not move back from the cant fast enough during the first fourth of the upward movement. If the crank or eccentric have its lead so set as to give a quick backward movement during the first fourth of the upward movement, the downward movement will be imperfect. The saws in their movement should describe an oval having a sharp-pointed upper end and a large or broad lower end. I accomplish the desired result by the use of a toggle-lever, interposed in the gearing between the crank or eccentric on the main shaft by which the rocking of the saws is effected and the pivoted cheek-pieces on which the saw-frame is guided, thus availing of the well-known principle that the nearer the toggles are in line the less the movement of the parts they move, and vice versa.

In the accompanying drawings I show different constructions showing different methods of applying the toggles. It would be impossible, almost, and certainly impracticable, for me to show all the various methods of applying the same. Suffice it to say that the only essential point is that the said toggles should be applied at some point between the main crank-shaft and the cheek-pieces within the system of levers and rock-shafts by which said cheek-pieces are vibrated, and it can make no essential difference as to what point is selected. I have shown them connected with the connecting-rod that connects with the crank-shaft or a crank operated by or from the main crank-shaft.

The accompanying drawings show my invention applied as follows:

Figure 1 is an elevation view of the inside of one of the side pieces of the frame of a gang-saw mill. Fig. 2 is a like view showing changes in the arrangement of parts, as will be explained hereinafter.

A marks the frame; B, the cheek-pieces; C, the main crank-shaft; C', an eccentric on said shaft for rocking the cheek-pieces. D D' are gearing in Fig. 2 for performing the same office as the eccentric C'. E marks the connecting-rod connecting with the eccentric C' or gear D', as the case may be. E' E' mark the toggles. F and G are rock-shafts. F' and F² are different forms of levers for rocking said shaft F. $f$ and $f'$ are connecting-rods. $g$ is a lever for rocking the rock-shaft G. $g'$ is a lever on said rock-shaft, and $g^2$ is a connecting-rod between said lever and the cheek-piece.

In each of the figures $b$ is the pivot of the cheek-piece B, and it will be observed that in Fig. 1 that pivot is at the lower end of said cheek-piece, while in Fig. 2 it is at the upper end. This change of position is shown only for the purpose of showing that so far as my invention is concerned it makes no difference at which end the cheek-piece is pivoted.

In Fig. 1, when the eccentric C' is used to rock the cheek-pieces the toggles E' are moved from the center in one direction only, and they are moved from and to the center at each revolution of the crank-shaft.

In Fig. 2 the gear D' is twice as large as the gear D, and hence it makes one revolution to two of the crank-shaft C; but the connecting-rod is made to move the toggles E' past their center line, so that they move from that line in each direction at one revolution of the gear D', and in so doing they rock the shaft F twice at each revolution of the gear D' or once for each revolution of the shaft C.

The above fully explains the modifications of construction shown. In the remainder of this description we shall refer only to the construction shown in Fig. 1, as all the essential features as to operation and effect are the same in each type. The position of parts is such as they occupy when the saw is at its upmost point, and is just ready to cut down through the log. The lead of the eccentric is at $c$ or past the line of the connecting-rod when the toggles are on their center. The fixed end of the toggles is at $e$, and the movable end at $e'$. It will be seen that as the eccentric moves, as indicated by the arrow on it, the toggles will be drawn down from their center, and that the further they are drawn down the more rapidly will the point $e'$ approach the point $e$, first, because such is the movement of a toggle, and, second, because the eccentric is passing through that part of its movement when it will move the connecting-rod the most rapidly. The increase thus given to the forward rocking movement of the cheek-pieces is thus proportioned to the increase in the rapidity of the downward movement of the saws; but when it comes to the last stage of the downward movement the toggles do not move slower, or rather they would not except for the fact that the eccentric is approaching the opposite end of its throw, and is moving the toggles very slow, and the further fact that the lead of the eccentric is placed in advance of the line of the connecting-rod, and so stops the downward movement of the toggles before the saws stop their downward movement. In fact, the saws will be commencing to rock back very slowly before they have completed their downward movement; but this will hardly be perceptible until the saws are started up, by which time the eccentric is beginning to move the connecting-rod rapidly, and the toggles from their position multiply this movement and throw the saws back very rapidly. As the saws approach their upward limit, not only the eccentric, but the toggles, give them a much less rapid movement, and before the saws are entirely up they begin to move forward, because of the advanced lead of the eccentric. In the connecting-rod there is shown a turn-buckle by which the rod may be lengthened and shortened. If an increased degree of rake or feed is wanted, the rod may be shortened and effect it.

What I claim as new is—

1. In a reciprocating-saw mill, the combination, with the pivoted cheek-pieces, which carry the guides for the saw-frame, of gearing for rocking the said cheek-pieces from the action of the main shaft, having a toggle, E' E', pivoted at one end to the frame, and at the other to the rock-bar, and the center piece provided with means for operating the toggles, substantially as shown, whereby the rocking movement given to said cheek-pieces will vary in rapidity at different points in their arc of vibration.

2. In a reciprocating-saw mill, the combination of pivoted cheek-pieces carrying the guides for the saw-frame, a rocking shaft for rocking said cheek-pieces, a toggle for moving said rocking shaft, and gearing, substantially as shown, for moving said toggle from the action of the main shaft from which the saw-frame is operated.

3. In a reciprocating-saw mill, the combination of the pivoted cheek-pieces B, rock-shaft F, gearing, substantially as shown, for operating said cheek-pieces from said rock-shaft, a toggle, E' E', for operating said rock-shaft, and gearing, substantially as shown, for operating said toggle from the main shaft C.

4. In a reciprocating-saw mill, the combination of the pivoted cheek-pieces B, rock-shaft F, toggles E' E', extensible connecting-rod E, and the gearing by which said connecting-rod is operated from the main shaft.

In testimony whereof I affix my signature in presence of two witnesses.

WM. M. WILKIN.

Witnesses:
J. K. HALLOCK,
ROBT. H. PORTER.